(12) United States Patent
Ohta

(10) Patent No.: US 10,124,812 B2
(45) Date of Patent: Nov. 13, 2018

(54) IN-VEHICLE ALERT APPARATUS AND METHOD OF CONTROLLING IN-VEHICLE ALERT APPARATUS

(71) Applicant: TOYOTA JIDOSHA KABUSHIKI KAISHA, Toyota-shi, Aichi-ken (JP)

(72) Inventor: Teppei Ohta, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/846,923

(22) Filed: Dec. 19, 2017

(65) Prior Publication Data

US 2018/0178811 A1 Jun. 28, 2018

(30) Foreign Application Priority Data

Dec. 26, 2016 (JP) ................. 2016-250556

(51) Int. Cl.
*B60Q 1/00* (2006.01)
*B60W 50/14* (2012.01)
*G06K 9/00* (2006.01)
*G08G 1/16* (2006.01)
*B60R 1/00* (2006.01)

(52) U.S. Cl.
CPC .............. *B60W 50/14* (2013.01); *B60R 1/00* (2013.01); *G06K 9/00798* (2013.01); *G06K 9/00805* (2013.01); *G08G 1/166* (2013.01); *G08G 1/167* (2013.01); *B60R 2300/8093* (2013.01); *B60W 2050/146* (2013.01)

(58) Field of Classification Search
CPC ...... B60W 50/14; B60R 1/00; G06K 9/00798

USPC ................... 340/435, 436, 425.5, 937, 539.1
See application file for complete search history.

(56) References Cited

U.S. PATENT DOCUMENTS

| | | | | |
|---|---|---|---|---|
| 9,365,162 | B2 * | 6/2016 | Nix | B60R 1/002 |
| 9,452,732 | B1 * | 9/2016 | Hermann | B60R 25/10 |
| 9,511,634 | B2 * | 12/2016 | Chan | B60C 23/003 |
| 9,723,274 | B2 * | 8/2017 | Lavoie | H04N 7/183 |
| 9,840,254 | B2 * | 12/2017 | Gupta | B60W 30/18 |
| 2007/0080850 | A1 | 4/2007 | Abe et al. | |

FOREIGN PATENT DOCUMENTS

JP 2005-084034 A 3/2005

* cited by examiner

*Primary Examiner* — Daryl Pope
(74) *Attorney, Agent, or Firm* — Hunton Andrews Kurth LLP

(57) ABSTRACT

An in-vehicle alert apparatus includes a camera sensor, a radar sensor, a display unit, and an electronic control unit. The electronic control unit specifies a position and a relative speed of an object by selectively using any of a fusion method and a camera-alone method. The electronic control unit extracts an obstacle and calculates a margin time period in which the obstacle reaches a tip end region of a host vehicle. The electronic control unit displays an alert screen that guides driver's line of sight in a direction of the obstacle having the margin time period less than or equal to a threshold. The electronic control unit prohibits display of a new alert screen while a first predetermined time period elapses from switching to the camera-alone method, and while a second predetermined time period elapses from switching to the fusion method.

7 Claims, 5 Drawing Sheets

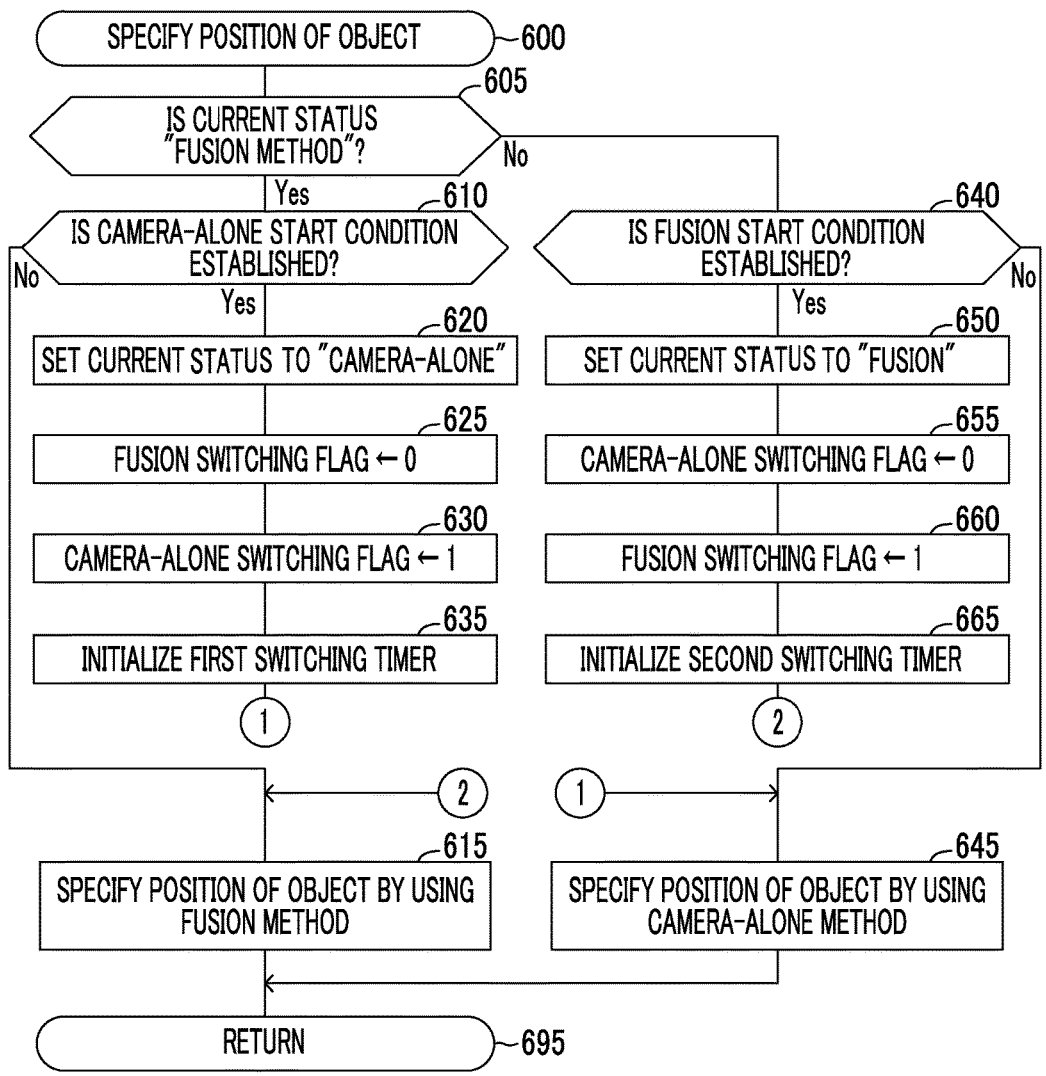

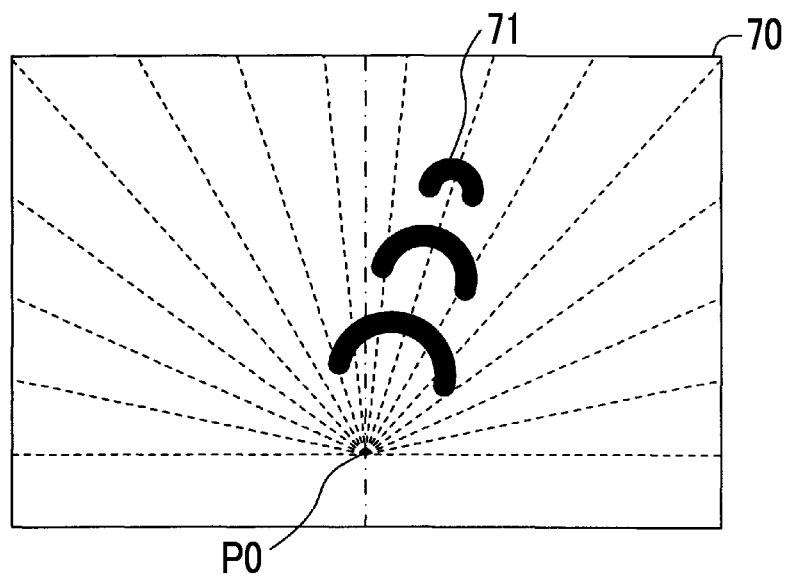

IN-VEHICLE ALERT APPARATUS AND METHOD OF CONTROLLING IN-VEHICLE ALERT APPARATUS

INCORPORATION BY REFERENCE

The disclosure of Japanese Patent Application No. 2016-250556 filed on Dec. 26, 2016 including the specification, drawings and abstract is incorporated herein by reference in its entirety.

BACKGROUND

1. Technical Field

The disclosure relates to an in-vehicle alert apparatus that extracts an obstacle having a possibility of colliding with a host vehicle based on first object information acquired by a camera sensor and second object information acquired by a radar sensor and alerts a driver to the obstacle by using a display unit, and a method of controlling an in-vehicle alert apparatus.

2. Description of Related Art

One of in-vehicle alert apparatuses in the related art (hereinafter, referred to as an "apparatus in the related art") includes two detectors of a millimeter wave radar and a stereo camera. The apparatus in the related art specifies the position of an object by specifying the azimuth of the object with respect to a host vehicle and the distance between the object and the host vehicle using the detection results of the two detectors. The apparatus in the related art specifies an object to which a driver should be alerted, by using the specified azimuth and position of the object (refer to, for example, Japanese Unexamined Patent Application Publication No. 2005-084034 (JP 2005-084034 A)).

SUMMARY

Generally, a radar sensor including a millimeter wave radar can detect the distance between a host vehicle and an object (hereinafter, referred to as a "relative distance") more accurately than a stereo camera. Accordingly, the relative distance measured by the radar sensor is desirably used as the relative distance that is used at the time of determining whether or not to provide alert. The stereo camera can detect the azimuth of the object with respect to the host vehicle more accurately than the radar sensor. Accordingly, the azimuth measured by the stereo camera is desirably used preferentially as the azimuth of the object that is used at the time of determining whether or not to provide alert. That is, the position (the relative distance and the azimuth) of the object is preferably specified based on both of the detection result of the radar sensor and the detection result of the stereo camera. Such a "method of specifying the position of the object by using both of the detection result of the radar sensor and the detection result of the stereo camera" may be referred to as a "fusion method".

For example, when a pedestrian is in a position relatively far from the host vehicle, the strength of the wave of the radar reflected by the pedestrian is relatively weak. Thus, the radar sensor may not detect the pedestrian. In such a case, since the detection result of the radar sensor is not acquired, a "camera-alone method" that specifies the position (the relative distance and the azimuth) of the object based on the detection result of the stereo camera is used.

When the method of specifying (acquiring) the position of the object is switched from the fusion method to the camera-alone method (or from the camera-alone method to the fusion method), there may be a significant change between the position of the object immediately before the switching and the position of the object immediately after the switching due to the difference between the accuracy of detecting the position of the object by the radar sensor and the accuracy of detecting the position of the object by the stereo camera. In such a case, there is a further decrease in the accuracy of estimating the relative speed or the like that is calculated based on the movement direction of the object with respect to the host vehicle and/or the amount of change in the position of the object, thus causing a situation in which an object having a relatively low possibility of colliding with the host vehicle is erroneously detected as an obstacle for which alert should be provided. Consequently, alert may be erroneously provided.

The present disclosure provides an in-vehicle alert apparatus that can further reduce the possibility of erroneously providing alert when a method of specifying the position of an object is switched, and a method of controlling an in-vehicle alert apparatus.

A first aspect of the present disclosure relates to an in-vehicle alert apparatus including a camera sensor configured to capture an image of a region around a host vehicle and detect an azimuth of an object with respect to the host vehicle and a distance between the object and the host vehicle based on the captured image, a radar sensor configured to radiate an electric wave to the region around the host vehicle, receive a reflective wave of the electric wave, and detect the azimuth of the object with respect to the host vehicle and the distance between the object and the host vehicle based on the reflective wave, a display unit on which an alert screen which guides driver's line of sight is displayed, and an electronic control unit. The electronic control unit is configured to specify a position and a relative speed of the object by selectively using any of a fusion method and a camera-alone method. The fusion method specifies the position of the object by specifying the azimuth of the object with respect to the host vehicle based on first object information and specifying the distance between the object and the host vehicle based on second object information and specifies the relative speed which is a speed of the object with respect to the host vehicle based on the second object information. The camera-alone method specifies the position of the object by specifying the azimuth of the object with respect to the host vehicle and specifying the distance between the object and the host vehicle based on the first object information and calculates the relative speed based on the specified distance. The first object information includes information related to the azimuth of the object with respect to the host vehicle and the distance between the object and the host vehicle detected by the camera sensor. The second object information includes information related to the azimuth of the object with respect to the host vehicle and the distance between the object and the host vehicle detected by the radar sensor. The electronic control unit is configured to acquire vehicle status information related to a traveling status of the host vehicle, extract an obstacle having a relatively high possibility of colliding with the host vehicle, based on at least one of the specified position of the object and a movement direction of the object depending on a change in the position of the object, calculate a margin time period in which the extracted obstacle reaches a tip end region including a front end portion of the host vehicle, based on the specified distance between the object and the host vehicle and the specified relative speed, and display a screen that guides driver's line of sight in a direction of the obstacle having the margin time period less than or equal to a threshold, as the alert screen on the display unit.

The electronic control unit is configured to switch a method of specifying the position and the relative speed of the object from the camera-alone method to the fusion method when the first object information and the second object information satisfy a first condition in specifying the position and the relative speed of the object by using the camera-alone method, and switch the method of specifying the position and the relative speed of the object from the fusion method to the camera-alone method when the first object information and the second object information satisfy a second condition in specifying the position and the relative speed of the object by using the fusion method.

The electronic control unit is configured to prohibit display of the alert screen for the object of which the position and the relative speed are specified by using the camera-alone method, while a first predetermined time period elapses from a time point of switching of the method of specifying the position and the relative speed of the object from the fusion method to the camera-alone method, and prohibit display of the alert screen for the object of which the position and the relative speed are specified by using the fusion method, while a second predetermined time period elapses from a time point of switching of the method of specifying the position and the relative speed of the object from the camera-alone method to the fusion method.

According to the first aspect of the present disclosure, display of the alert screen is prohibited for the object of which the position and the relative speed are specified by using the camera-alone method, while the first predetermined time period elapses from the time point of switching from the fusion method to the camera-alone method. Similarly, display of the alert screen is prohibited for the object of which the position and the relative speed are specified by using the fusion method, while the second predetermined time period elapses from the time point of switching from the camera-alone method to the fusion method.

Accordingly, even when there is a significant change between the position of the object immediately before switching and the position of the object immediately after switching due to the difference between the accuracy of detecting the position of the object by a radar sensor and the accuracy of detecting the position of the object by a stereo camera, the possibility of erroneously providing alert for the object having a relatively low possibility of colliding with the host vehicle can be further reduced.

In the in-vehicle alert apparatus according to the first aspect of the present disclosure, the electronic control unit may configured to set the second predetermined time period to a shorter time period than the first predetermined time period.

According to the first aspect of the present disclosure, the second predetermined time period in which display of a new alert screen is prohibited at the time of switching from the camera-alone method to the fusion method is set to be shorter than the first predetermined time period in which display of a new alert screen is prohibited at the time of switching from the fusion method to the camera-alone method. Thus, the driver can immediately recognize the alert screen for the object of which the position is accurately specified by using the fusion method having higher accuracy of detecting the position of the object than the camera-alone method.

In the in-vehicle alert apparatus according to the first aspect of the present disclosure, the first condition may be that a difference greater than an allowable difference between a detection result of the first object information and a detection result of the second object information is resolved, and the second condition may be that a difference greater than the allowable difference is generated between the detection result of the first object information and the detection result of the second object information.

In the in-vehicle alert apparatus according to the first aspect of the present disclosure, when a new object is detected in the second object information, and the position of the object indicated by the second object information is within a predetermined range from the position of the object detected in the first object information, the first condition may be satisfied, and when the difference greater than the allowable difference is generated between the detection result of the first object information and the detection result of the second object information, the second condition may be satisfied.

In the in-vehicle alert apparatus according to the first aspect of the present disclosure, the first condition may be that a difference between a relative distance of the object detected by the camera sensor and the relative distance of the same object detected by the radar sensor is less than a threshold distance, and that a difference between the azimuth of the object detected by the camera sensor and the azimuth of the same object detected by the radar sensor is less than a threshold angle.

In the in-vehicle alert apparatus according to the first aspect of the present disclosure, the second condition may be a condition that is established when at least one of i) the object detected in the first object information is not detected in the second object information, and ii) the position of the object detected in the first object information and the position of the object detected in the second object information are not within the predetermined range, is established.

A second aspect of the present disclosure relates to a method of controlling an in-vehicle alert apparatus including a camera sensor configured to capture an image of a region around a host vehicle and detect an azimuth of an object with respect to the host vehicle and a distance between the object and the host vehicle based on the captured image, a radar sensor configured to radiate an electric wave to the region around the host vehicle, receive a reflective wave of the electric wave, and detect the azimuth of the object with respect to the host vehicle and the distance between the object and the host vehicle based on the reflective wave, a display unit on which an alert screen which guides driver's line of sight is displayed, and an electronic control unit. The method of controlling an in-vehicle alert apparatus includes specifying a position and a relative speed of the object by selectively using any of a fusion method and a camera-alone method. The fusion method specifies the position of the object by specifying the azimuth of the object with respect to the host vehicle based on first object information and specifying the distance between the object and the host vehicle based on second object information and specifies the relative speed which is a speed of the object with respect to the host vehicle based on the second object information. The camera-alone method specifies the position of the object by specifying the azimuth of the object with respect to the host vehicle and specifying the distance between the object and the host vehicle based on the first object information and calculates the relative speed based on the specified distance. The first object information includes information related to the azimuth of the object with respect to the host vehicle and the distance between the object and the host vehicle detected by the camera sensor. The second object information includes information related to the azimuth of the object with respect to the host vehicle and the distance between the object and the host vehicle detected by the radar sensor. The method of controlling an in-vehicle alert apparatus includes acquiring vehicle status information related to a traveling status of the host vehicle, extracting an obstacle having a relatively high possibility of colliding with the host vehicle, based on at least one of the specified position of the object and a movement direction of the object depending on a change in the position of the object, and calculating a margin time period in which the extracted obstacle reaches a tip end region including a front end portion of the host vehicle, based on the specified distance between the object and the host vehicle and the specified relative speed. The method of controlling an in-vehicle alert apparatus includes displaying a screen that guides driver's line of sight in a direction of the obstacle having the margin time period less than or equal to a threshold, as the alert screen on the display unit, switching a method of specifying the position and the relative speed of the object from the camera-alone method to the fusion method when the first object information and the second object information satisfy a first condition in specifying the position and the relative speed of the object by using the camera-alone method, and switching the method of specifying the position and the relative speed of the object from the fusion method to the camera-alone method when the first object information and the second object information satisfy a second condition in specifying the position and the relative speed of the object by using the fusion method. The method of controlling an in-vehicle alert apparatus includes prohibiting display of the alert screen for the object of which the position and the relative speed are specified by using the camera-alone method, while a first predetermined time period elapses from a time point of switching of the method of specifying the position and the relative speed of the object from the fusion method to the camera-alone method, and prohibiting display of the alert screen for the object of which the position and the relative speed are specified by using the fusion method, while a second predetermined time period elapses from a time point of switching of the method of specifying the position and the relative speed of the object from the camera-alone method to the fusion method.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is a flowchart illustrating a routine executed by the CPU of the alert ECU in an object position specification process illustrated in FIG. 5; and FIG. 7 is a diagram describing an alert screen.

DETAILED DESCRIPTION OF EMBODIMENTS

Hereinafter, an in-vehicle alert apparatus and a method of controlling an in-vehicle alert apparatus according to an embodiment of the present disclosure will be described by using the drawings. A vehicle in which the in-vehicle alert apparatus according to the embodiment of the present disclosure is mounted will be referred to as a "host vehicle" when the vehicle should be distinguished from other vehicles.

Figure 1:
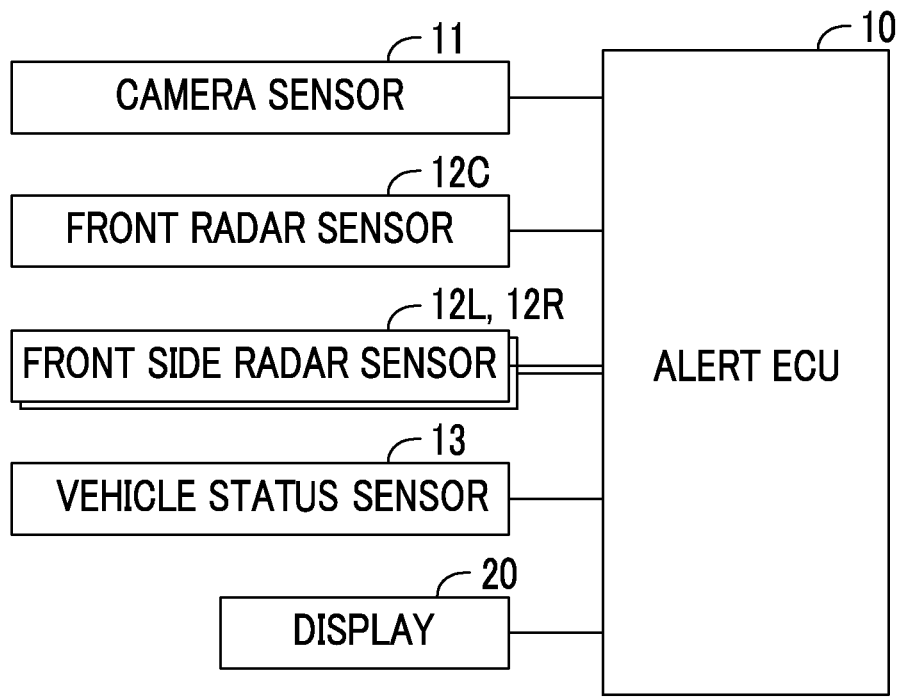
FIG. 1 is a schematic system configuration diagram of a driving assistance apparatus according to an embodiment of the present disclosure.

FIG. 1 is a schematic system configuration diagram of the in-vehicle alert apparatus according to the embodiment of the present disclosure (hereinafter, referred to as the "present embodied apparatus"). The present embodied apparatus is an apparatus that is mounted in the host vehicle and alerts a driver (operator) of the host vehicle to an obstacle having a relatively high possibility of colliding with the host vehicle (that is, an apparatus that provides alert for an obstacle). The present embodied apparatus includes an alert ECU 10 (an example of an electronic control unit). ECU is the abbreviation for "Electronic Control Unit" and includes a microcomputer as a main part. The microcomputer includes a CPU and a storage such as a ROM and a RAM. The CPU realizes various functions by executing instructions (programs and routines) stored in the ROM.

The present embodied apparatus further includes a camera sensor 11, a front radar sensor 12C, front side radar sensors 12L, 12R, a vehicle status sensor 13, and a display 20. The alert ECU 10 is connected to the camera sensor 11, the front radar sensor 12C, the front side radar sensors 12L, 12R, the vehicle status sensor 13, and the display 20.

The camera sensor 11 includes a vehicle-mounted stereo camera and an image processing device (both are not illustrated). The vehicle-mounted stereo camera captures a region in front of the host vehicle. The image processing device processes the image captured by the vehicle-mounted stereo camera.

The vehicle-mounted stereo camera transmits an image signal representing the captured image to the image processing device for each elapse of a predetermined time period.

The image processing device determines whether or not an object is present in the capturing region, based on the received image signal. When the image processing device determines that an object is present, the image processing device calculates the azimuth (direction) of the object with respect to the host vehicle and the distance (that is, the relative distance) between the object and the host vehicle, and identifies the type of object (a pedestrian, a bicycle, an automobile, and the like) by pattern matching. The distance between the object and the host vehicle is calculated based on the disparity between a left image and a right image captured by the vehicle-mounted stereo camera. The measurement of the position (the relative distance and the azimuth) of the object by the vehicle-mounted stereo camera has relatively high accuracy of detecting the azimuth of the object with respect to the host vehicle and relatively low accuracy of detecting the distance between the object and the host vehicle.

The camera sensor 11 outputs information indicating the position (that is, the relative distance and the azimuth) of the object and information indicating the type of object to the alert ECU 10 for each elapse of a predetermined time period. The alert ECU 10 can specify a change in the position of the object based on the information indicating the position of the object in the input object information. The alert ECU 10 can find the speed (that is, the relative speed) and the relative movement trajectory of the object with respect to the host vehicle based on the specified change in the position of the object.

Figure 2:
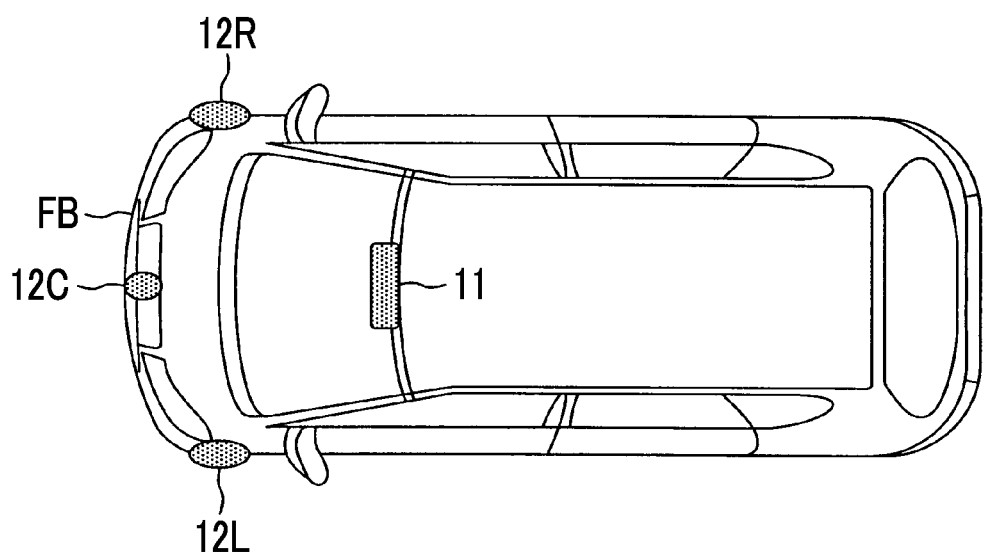
FIG. 2 is a diagram describing positions in which radar sensors and a camera sensor illustrated in FIG. 1 are attached.

As illustrated in FIG. 2, the front radar sensor 12C is disposed in the position of the center in the vehicle width direction of a front bumper FB of the host vehicle. The front side radar sensor 12R is disposed in a right corner portion of the front bumper FB. The front side radar sensor 12L is disposed in a left corner portion of the front bumper FB. Hereinafter, the front radar sensor 12C and the front side radar sensors 12L, 12R will be collectively referred to as a "radar sensor 12".

The radar sensor 12 radiates an electric wave in a millimeter wave band (hereinafter, referred to as a "millimeter wave"). When an object is present within the radiation range of the millimeter wave, the object reflects the millimeter wave radiated from the radar sensor 12. The radar sensor 12 receives the reflective wave and detects the distance (that is, the relative distance) between the host vehicle and the object, the azimuth of the object with respect to the host vehicle, the speed (that is, the relative speed) of the object with respect to the host vehicle, and the like based on the reflective wave.

Figure 3:
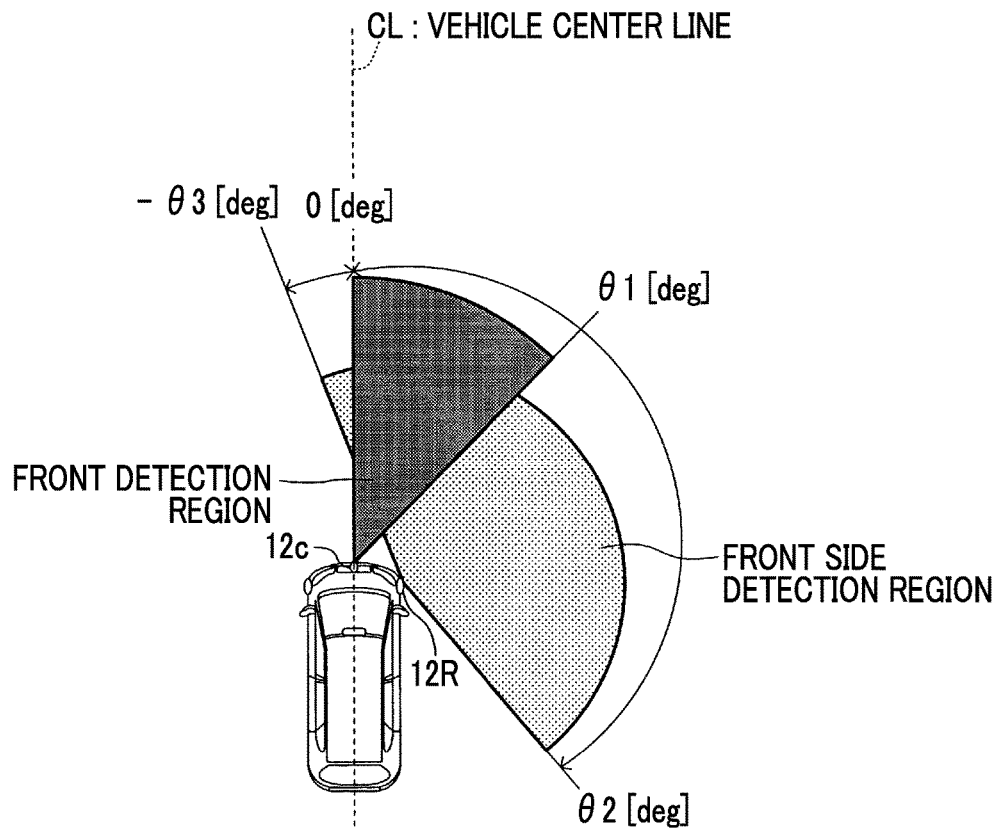
FIG. 3 is a diagram describing detection regions of the radar sensors illustrated in FIG. 1.

As illustrated in FIG. 3, the detection region of the front radar sensor 12C has a range of ±θ1 deg (0 deg <θ1<90 deg) from a vehicle front-rear axis (vehicle center line CL) in the right-left direction. In FIG. 3, the front side of the vehicle front-rear axis is defined as 0 deg, and the range of the front radar sensor 12C in the left direction is not illustrated. Accordingly, the front radar sensor 12C mainly detects an object in front of the host vehicle. The detection region of the front side radar sensor 12R is θ2 deg (90 deg <θ2<180 deg) in the right direction and −θ3 deg (0 deg <θ3<90 deg) in the left direction from the vehicle front-rear axis. Accordingly, the front side radar sensor 12R mainly detects an object on the right side of the host vehicle. The detection region of the front side radar sensor 12L is, though not illustrated, a region that is bilaterally symmetric with the detection region of the front side radar sensor 12R about the vehicle front-rear axis. Accordingly, the front side radar sensor 12L mainly detects an object on the left side of the host vehicle. The detection distance of each of the radar sensors 12C, 12L, 12R is, for example, a few tens of meters. Each of the radar sensors 12C, 12L, 12R detects the position information of the object (the distance between the host vehicle and the object and the azimuth of the object with respect to the host vehicle) and the relative speed of the object for each elapse of a predetermined time period, and transmits the detected position information and relative speed to the alert ECU 10 for each elapse of a predetermined time period. Accordingly, the alert ECU 10 can find the relative speed and the relative movement trajectory of the object with respect to the host vehicle based on the information transmitted from the radar sensor 12.

Information that is related to the "distance (relative distance) between the object and the host vehicle and the azimuth of the object with respect to the host vehicle" detected by the camera sensor 11 will be referred to as "first object information". "Information that is related to the distance (relative distance) between the object and the host vehicle and the azimuth and the relative speed of the object with respect to the host vehicle" detected by the radar sensor 12 will be referred to as "second object information".

The vehicle status sensor 13 is a sensor acquiring vehicle status information that is related to the traveling status of the host vehicle used for estimating the traveling course of the host vehicle. The vehicle status sensor 13 includes a vehicle speed sensor, an acceleration sensor, a yaw rate sensor, a steering angle sensor, and the like. The vehicle speed sensor detects the speed of the vehicle body (that is, the vehicle speed) of the host vehicle. The acceleration sensor detects the acceleration of the host vehicle in the front-rear direction and the right-left (lateral) direction in the horizontal direction. The yaw rate sensor detects the yaw rate of the host vehicle. The steering angle sensor detects the steering angle of a steering wheel. The vehicle status sensor 13 outputs the vehicle status information to the alert ECU 10 for each elapse of a predetermined time period.

The alert ECU 10 calculates the turning radius of the host vehicle based on the vehicle speed detected by the vehicle speed sensor and the yaw rate detected by the yaw rate sensor. The alert ECU 10 estimates a traveling course along which the center in the vehicle width direction of the host vehicle (in actuality, the center on an axle of right and left front wheels of the host vehicle) is moved as a predicted traveling course based on the turning radius. When the yaw rate is generated, the predicted traveling course has an arc shape. When the yaw rate is zero, the alert ECU 10 estimates a linear course extending in the direction of the acceleration detected by the acceleration sensor as the traveling course along which the host vehicle is moved (that is, the predicted traveling course). The alert ECU 10 recognizes (determines) the predicted traveling course as a path (that is, a line having a finite length) from the host vehicle to a location at a predetermined distance along the predicted traveling course, regardless of whether the host vehicle is turning or traveling straight.

The display 20 is a head-up display (hereinafter, referred to as an "HUD"). The HUD receives display information from various ECUs and a navigation device in the host vehicle and projects the display information to a partial region (display region) of a windshield of the host vehicle. When an alert target described below is detected, the alert ECU 10 transmits a display instruction for an alert screen 70 (refer to FIG. 7) to the HUD. Accordingly, by using a part of the display region, the HUD displays the alert screen 70 that guides driver's line of sight in the direction of the alert target. The alert screen will be described in detail below.

The display 20 is not particularly limited to the HUD. That is, the display 20 may be a multi-information display (MID), a touch panel of the navigation device, and the like. The MID is a display panel in which meters such as a speedometer, a tachometer, a fuel gauge, a water temperature gauge, an odometer or a trip meter, and a warning lamp are collectively disposed on a dashboard.

Summary of Operation

The present embodied apparatus specifies the position of an object by selectively using a method of specifying the position or the like of the object based on both of the first object information from the camera sensor 11 and the second object information from the radar sensor 12 (fusion method), and a method of specifying the position or the like of the object based on the first object information (camera-alone method).

According to the fusion method, the azimuth of the object with respect to the host vehicle is specified based on the first object information (that is, the object information from the camera sensor 11), and the distance between the object and the host vehicle is specified based on the second object information (that is, the object information from the radar sensor 12). According to the camera-alone method, the azimuth of the object with respect to the host vehicle and the distance between the object and the host vehicle are specified based on the first object information (that is, the object information from the camera sensor 11). In the fusion method, the azimuth of the object with respect to the host vehicle may be specified based on both of the first object information (that is, the object information from the camera sensor 11) and the second object information (that is, the object information from the radar sensor 12).

The azimuth of the object with respect to the host vehicle based on the first object information is specified based on the image captured by the camera sensor 11. Thus, the accuracy of detecting the azimuth with respect to the host vehicle based on the first object information is relatively high.

The distance (relative distance) between the object and the host vehicle based on the first object information is specified based on the disparity between the left image and the right image captured by the camera sensor 11 which is the vehicle-mounted stereo camera. The distance between the object and the host vehicle based on the second object information is specified based on a delay in the reflective wave of the electric wave radiated by the radar sensor 12 (a time period from the radiation to the reception of the reflective wave). Thus, the accuracy of detecting the distance between the object and the host vehicle based on the first object information is lower than the accuracy of detecting the distance between the object and the host vehicle based on the second object information.

That is, the accuracy of detecting the azimuth of the object with respect to the host vehicle included in the first object information is relatively high, and the accuracy of detecting the distance between the object and the host vehicle included in the first object information is relatively low. The accuracy of detecting the "distance between the object and the host vehicle and the relative speed of the object" included in the second object information is relatively high, and the accuracy of detecting the azimuth of the object with respect to the host vehicle included in the second object information is relatively low.

Accordingly, the fusion method accurately specifies the relative distance and the azimuth of the object. The camera-alone method accurately specifies the azimuth of the object and specifies the relative distance of the object with slightly low accuracy.

Figure 4:
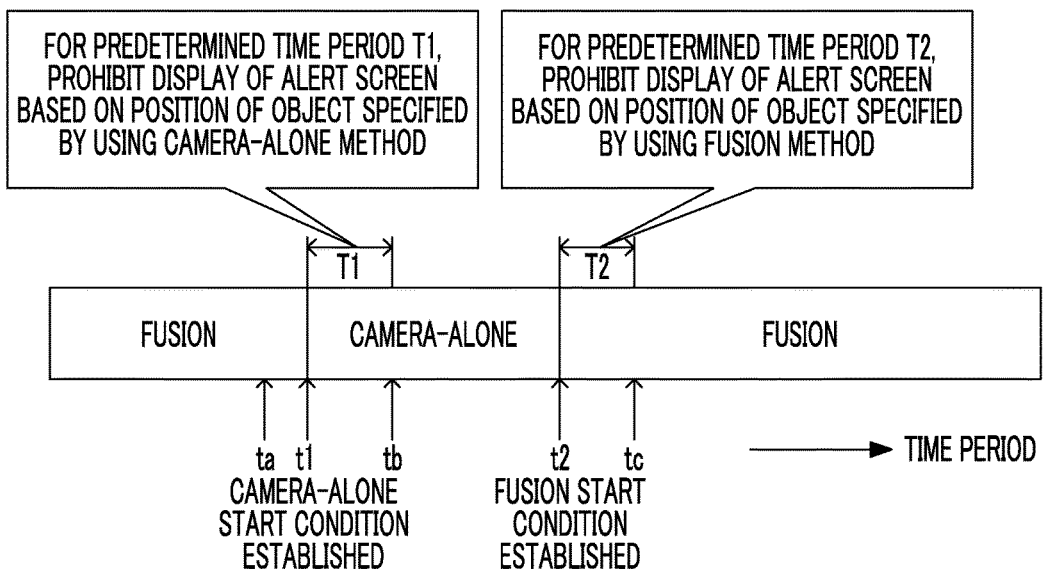
FIG. 4 is a timing chart when a method of specifying the position of an object is switched.

As illustrated in FIG. 4, it is assumed that the present embodied apparatus specifies the position of the object by using the fusion method at time ta. In such a case, the present embodied apparatus determines whether or not the first object information and the second object information satisfy a camera-alone start condition (referred to as a "second condition"), each time the present embodied apparatus acquires new first object information and second object information. When the "camera-alone start condition" is established at time t1 illustrated in FIG. 4, the present embodied apparatus switches the method of specifying the position of the object from the fusion method to the camera-alone method. Details of the camera-alone start condition will be described below.

When the method of specifying the position of the object is switched from the fusion method to the camera-alone method, the azimuth of the object is specified based on the first object information in the same manner as the fusion method. However, the distance between the host vehicle and the object is specified based on the first object information unlike the fusion method.

Accordingly, when the method of specifying the position of the object is switched from the fusion method to the camera-alone method (or from the camera-alone method to the fusion method), the method of specifying the distance between the object and the host vehicle is different from the previous (immediately before the switching) specification method. Thus, the "distance between the object and the host vehicle specified immediately after the switching of the method of specifying the position of the object" may be significantly changed from the "distance between the object and the host vehicle specified immediately before the switching of the method of specifying the position of the object. In other words, the position of the object immediately after the switching of the method of specifying the position of the object may be significantly changed from the position of the object immediately before the switching.

The present embodied apparatus extracts an object (includes an object that abnormally approaches the host vehicle) having a relatively high possibility of colliding with the host vehicle as an obstacle from objects detected based on the first object information and/or the second object information. When the obstacle satisfies a predetermined condition (alert condition), the present embodied apparatus displays the alert screen 70 (refer to FIG. 7) that guides driver's line of sight in the direction of where the obstacle is present (that is, provides alert).

In the process of extracting the obstacle, the movement direction of the object is calculated by using time-series data of the position of the object, and the obstacle is extracted based on the calculated movement direction of the object. Thus, as described above, when the position of the object is significantly changed immediately after the switching of the method of specifying the position of the object, the calculated movement direction of the object becomes incorrect. Thus, an object that is not the target of alert may be extracted as the obstacle having a possibility of being the target of alert.

As described above, the present embodied apparatus provides alert by displaying the alert screen 70 when the obstacle extracted as the object having a possibility of being the target of alert satisfies the predetermined condition. The predetermined condition is a condition that is established when a margin time period (time-to-collision (TTC)) is less than or equal to a threshold (threshold time period) T1th in the present embodied apparatus.

The margin time period (time-to-collision) TTC is any of a time period TTC1 and a time period TTC2 below.

A time period TTC1 to a time point at which an obstacle is predicted to collide with the host vehicle (a time period from the current time point to a predicted collision time point).

A time period TTC2 to a time point at which an obstacle having a possibility of passing on a side of the host vehicle approaches the closest point to the host vehicle (a time period from the current time point to a predicted closest point approaching time point).

The margin time period TTC is calculated by dividing the distance (relative distance) between the host vehicle and the obstacle by the speed (relative speed) of the obstacle with respect to the host vehicle. That is, the margin time period TTC is a time period in which the obstacle reaches the "tip end region of the host vehicle" when it is assumed that the obstacle and the host vehicle move while maintaining the current relative speed and relative movement direction thereof. The tip end region of the host vehicle is a region represented by a line that connects a point positioned at a certain distance α on the left side from the left end of the front end portion of the vehicle body of the host vehicle and a point positioned at the certain distance α on the right side from the right end of the front end portion of the vehicle body of the host vehicle. When an obstacle is determined not to reach the tip end region of the host vehicle based on the movement direction of the obstacle, the margin time period TTC is set to infinity (in actuality, a value that is sufficiently greater than the threshold time period T1th).

When the camera-alone method is used, the relative speed is calculated based on the amount of change between the relative distance of the object before a predetermined time period included in the first object information and the most recent relative distance of the object included in the first object information, since the first object information (that is, the object information from the camera sensor 11) does not include the relative speed. Similarly, when the method of specifying the position of the object is switched from the fusion method to the camera-alone method, the relative speed of the object should be calculated based on the amount of change between the relative distance of the object before the predetermined time period included in the second object information and the most recent relative distance of the object included in the first object information. Thus, when the position of the object is significantly changed at the time of switching the method of specifying the position of the object from the fusion method to the camera-alone method, the relative speed of the object may be calculated as having a value that is suddenly increased. In such a case, the margin time period TTC may become less than or equal to the threshold T1th, and alert may be erroneously provided.

Therefore, as illustrated in FIG. 4, when the method of specifying the position of the object is switched from the fusion method to the camera-alone method at time t1, the present embodied apparatus prohibits display of the alert screen 70 (that is, a new alert screen 70) for the object of which the position is specified by using the camera-alone method, from the time point of the switching (that is, time t1) to the time point after elapse of a predetermined time period T1 (that is, time tb). Accordingly, the occurrence of such a situation of erroneous alert can be further prevented.

After elapse of the predetermined time period T1 from the switching to the camera-alone method, the present embodied apparatus extracts an object having a relatively high possibility of colliding with the host vehicle as an obstacle based on the position of the object specified by using the camera-alone method. When the extracted obstacle satisfies the predetermined condition, the present embodied apparatus displays the alert screen 70 (refer to FIG. 7) that guides driver's line of sight in the direction of the obstacle.

In FIG. 4, when the present embodied apparatus determines that the first object information and the second object information acquired at time t2 satisfy a fusion start condition (referred to as a "first condition"), the present embodied apparatus switches the method of specifying the position of the object from the camera-alone method to the fusion method. Details of the fusion start condition will be described below.

Even immediately after the method of specifying the position of the object is switched from the camera-alone method to the fusion method, there may be a significant change between the "distance between the object and the host vehicle specified immediately before the switching" and the "distance between the object and the host vehicle specified immediately after the switching" as described above. In such a case, the movement direction of the object is not correctly calculated, and an object that may not be the target of alert may be selected as the target of alert. Therefore, when the method of specifying the position of the object is switched from the fusion method to the camera-alone method at time t2, the present embodied apparatus prohibits display of the alert screen 70 (that is, a new alert screen 70) for the object of which the position is specified by using the fusion method, from the time point of the switching (that is, time t2) to the time point after elapse of a predetermined time period T2 (that is, time tc).

Specific Operation

The CPU of the alert ECU 10 (hereinafter, the "CPU" will refer to the CPU of the alert ECU 10 unless otherwise specified) executes a routine illustrated by a flowchart in FIG. 5 for each elapse of a predetermined time period. The routine illustrated in FIG. 5 is a routine for displaying the alert screen 70 (refer to FIG. 7).

Figure 5:
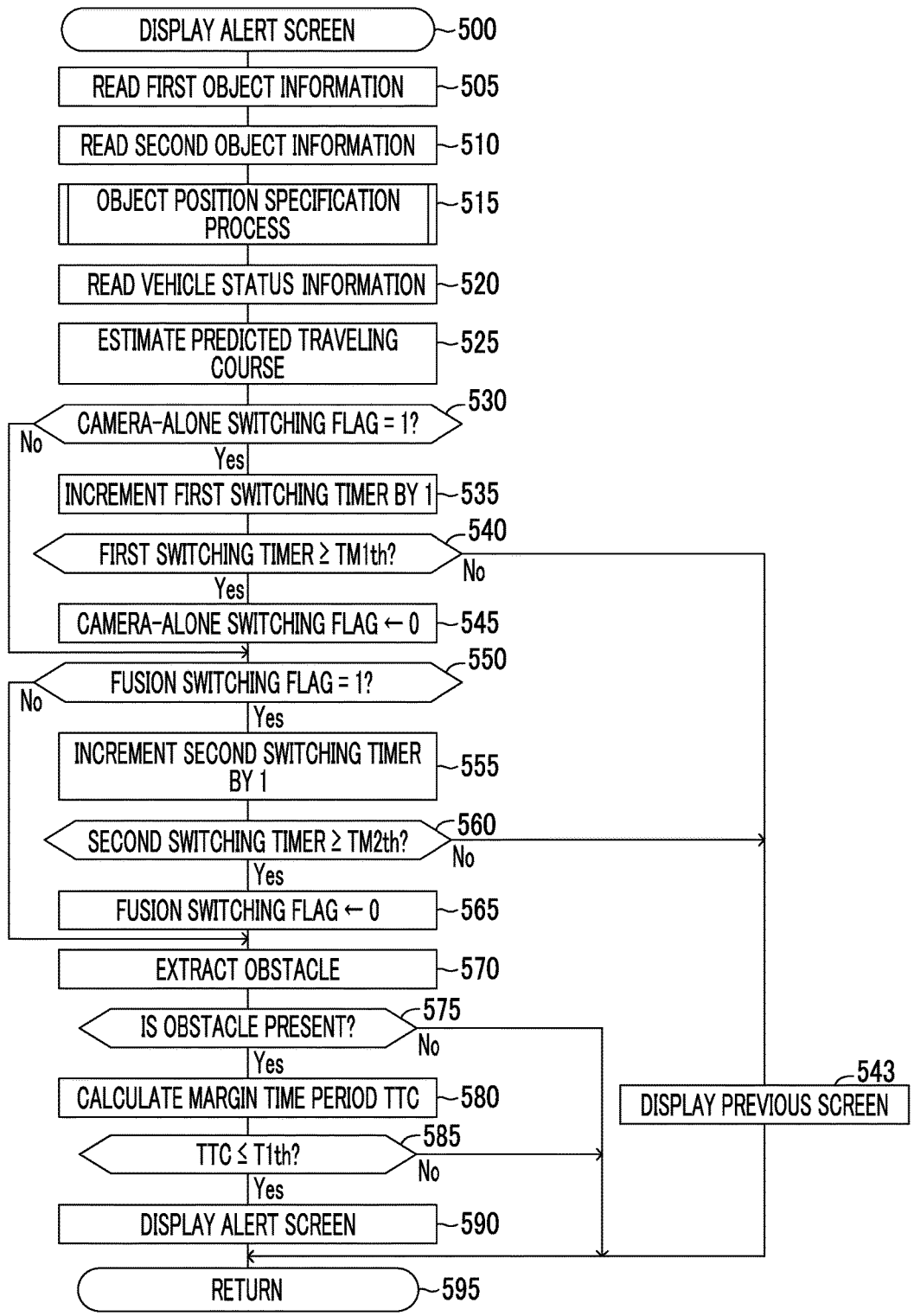
FIG. 5 is a flowchart illustrating a routine executed by a CPU of an alert ECU illustrated in FIG. 1.

Accordingly, when a predetermined timing arrives, the CPU starts processing from step 500 in FIG. 5 and transitions to step 505 to read the first object information from the camera sensor 11. Next, the CPU transitions to step 510 to read the second object information from the radar sensor 12.

Next, the CPU transitions to step 515 to execute an object position specification process that specifies the position of the object. In actuality, when the CPU transitions to step 515, the CPU executes a subroutine illustrated by a flowchart in FIG. 6.

That is, when the CPU transitions to step 515, the CPU starts processing from step 600 in FIG. 6 and transitions to step 605 to determine whether or not information that indicates the method of specifying the position of the object currently indicates the fusion method. The information indicating the method of specifying the position of the object indicates any of the camera-alone method and the fusion method. The information indicating the method of specifying the position of the object is set to indicate the fusion method for convenience when an ignition key switch, not illustrated, of the host vehicle is changed from an OFF status to an ON status.

When the information indicating the method of specifying the position of the object indicates the fusion method, the CPU makes a "Yes" determination in step 605 and transitions to step 610. The CPU in step 610 determines whether or not the "first object information read in step 505 and the second object information read in step 510" satisfy the camera-alone start condition.

Details of the camera-alone start condition will be described. The camera-alone start condition is a condition that is established when the method of specifying the position of the object should be switched from the fusion method to the camera-alone method due to a difference greater than allowable difference between the detection result of the first object information and the detection result of the second object information. That is, the camera-alone start condition is a condition that is established when a difference greater than allowable difference being generated between the detection result of the first object information and the detection result of the second object information is detected.

More specifically, the camera-alone start condition is a condition that is established when at least one of (1) and (2) is established. When at least one of (1) and (2) is established, the CPU makes a "Yes" determination in step 610.

(1) An object that is detected in the first object information is not detected in the second object information (in other words, an object that is detected by the camera sensor 11 is not detected by the radar sensor 12).

(2) The position of an object detected in the first object information and the position of an object detected in the second object information are not within a predetermined range (in other words, the difference between the relative distance of an object detected by the camera sensor 11 and the relative distance of the same object detected by the radar sensor 12 is greater than or equal to a threshold distance, and/or the difference between the azimuth of the object detected by the camera sensor 11 and the azimuth of the same object detected by the radar sensor 12 is greater than or equal to a threshold angle).

Three examples in which the camera-alone start condition is established will be described. The first example is when the radar sensor 12 cannot receive a reflective wave from an object having relatively weak reflection intensity for the electric wave in the millimeter wave band (for example, a pedestrian). In such a case, the object detected in the first object information is not detected in the second object information. Thus, (1) is established, and the camera-alone start condition is established. Such a situation is particularly likely to occur when the object having relatively weak reflection intensity for the millimeter wave band is present at a far distance.

The second example is when an object detected as one object in the first object information is detected as a plurality of objects in the second object information. For example, a vehicle having a long total length or vehicle width is detected as a plurality of objects in the second object information. In such a case, an object that corresponds to one object detected in the first object information is determined not to be detected in the second object information, and (1) is established. In such a case, the position of one object detected in the first object information and the position of one of the objects detected in the second object information may be determined not to be within the predetermined range, and (2) may be established.

The third example is when an object detected as a plurality of objects in the first object information is detected as one object in the second object information. For example, a plurality of objects that is present at a near distance is detected as one object in the second object information. In such a case, one object detected in the first object information is determined not to be detected in the second object information, and (1) is established. In such a case, the position of one of the objects detected in the first object information and the position of one object detected in the second object information may be determined not to be within the predetermined range, and (2) may be established.

When the first object information read in step 505 and the second object information read in step 510 do not satisfy the camera-alone start condition, the CPU makes a "No" determination in step 610 and transitions to step 615.

In step 615, the CPU specifies the position (the relative distance and the azimuth) of the object by using the fusion method. The CPU transitions to step 695 to temporarily finish the present routine, and transitions to step 520 in FIG. 5. More specifically, the CPU specifies the azimuth of the object with respect to the host vehicle based on the first object information, and specifies the distance (relative distance) between the object and the host vehicle based on the second object information.

Next, in step 520, the CPU reads the vehicle status information acquired by the vehicle status sensor 13 and transitions to step 525.

In step 525, the CPU estimates the predicted traveling course as described above based on the vehicle status information read in step 520, and transitions to step 530.

In step 530, the CPU determines whether or not a camera-alone switching flag is set to "1". The camera-alone switching flag is set to "1" at a time point at which the method of specifying the position of the object is switched to the camera-alone method (a time point at which the camera-alone start condition is established when the method of specifying the position of the object is the fusion method) (refer to step 630 in FIG. 6 described below). The camera-alone switching flag is a flag that is set to "0" at the time point after elapse of the predetermined time period T1 from the time point of being set to "1" (refer to step 545 in FIG. 5 described below), or at the time point of switching the method of specifying the position of the object to the fusion method before elapse of the predetermined time period T1 from the time point of being set to "1" (a time point at which the fusion start condition is established when the method of specifying the position of the object is the camera-alone method; refer to step 655 in FIG. 6 described below).

When the camera-alone switching flag is not set to "1", the CPU makes a "No" determination in step 530 and transitions to step 550. In step 550, the CPU determines whether or not a fusion switching flag is set to "1".

The fusion switching flag is set to "1" at the time point of switching the method of specifying the position of the object to the fusion method (a time point at which the fusion start condition is established when the method of specifying the position of the object is the camera-alone method) (refer to step 660 in FIG. 6 described below). The fusion switching flag is a flag that is set to "0" at the time point after elapse of the predetermined time period T2 from the time point of being set to "1" (refer to step 565 in FIG. 5 described below), or at the time point of switching the method of specifying the position of the object to the camera-alone method before elapse of the predetermined time period T2 from the time point of being set to "1" (a time point at which the camera-alone start condition is established when the method of specifying the position of the object is the fusion method; refer to step 625 in FIG. 6 described below).

When the fusion switching flag is not set to "1", the CPU makes a "No" determination in step 550 and transitions to step 570. In step 570, the CPU extracts an object having a possibility of colliding with the host vehicle (includes an object that approaches the closest point to the host vehicle) as an obstacle based on the position of the object specified in step 515 and the predicted traveling course estimated in step 525. More specifically, the CPU estimates, as a predicted center traveling course, a traveling course along which the center on the axle of the right and left front wheels of the host vehicle is moved. The CPU estimates a left-side predicted traveling course and a right-side predicted traveling course as the predicted traveling course based on the predicted center traveling course. A point that is positioned on the left side at the certain distance α from the left end of the front end portion of the vehicle body of the host vehicle passes through the left-side predicted traveling source. A point that is positioned on the right side at the certain distance α from the right end of the front end portion of the vehicle body of the host vehicle passes through the right-side predicted traveling course. The CPU specifies a region between the left-side predicted traveling course and the right-side predicted traveling course as a predicted traveling course region.

The CPU calculates (estimates) the movement trajectory of the object based on the position of the object specified in step 515 of the present routine executed currently and the positions of the object specified in step 515 of the present routine executed a few times previously. The CPU calculates the movement direction of the object with respect to the host vehicle based on the calculated movement trajectory of the object. Next, based on the predicted traveling course region, the relative relationship (the relative position and the relative speed) between the host vehicle and the object, and the movement direction of the object with respect to the host vehicle, the CPU extracts an object that is already present within the predicted traveling course region, and an object that is predicted to enter the predicted traveling course region and intersect with the tip end region of the host vehicle, as an object having a possibility of colliding with the host vehicle (that is, an obstacle).

Hereinafter, the process of step 570 will be more specifically described. When the CPU detects an object in front of the host vehicle based on the "first object information and/or the second object information", the CPU determines whether or not the object is within the predicted traveling course region and whether or not the object may enter the predicted traveling course region and intersect with the tip end region of the host vehicle. In such a case, the front of the host vehicle refers to the detection region of the front radar sensor 12C. Specifically, when the position of the object specified in step 515 is within the predicted traveling course region, the CPU determines that the object is within the predicted traveling course region. When a line that extends in the movement direction of the object from the position of the object specified in step 515 intersects with the predicted traveling course region and the tip end region of the host vehicle, the CPU determines that the object "may enter the predicted traveling course region and intersect with the tip end region of the host vehicle".

When the CPU determines that the object "is within the predicted traveling course region or may enter the predicted traveling course region and intersect with the tip end region of the host vehicle", and the camera sensor 11 determines that the object is a pedestrian, the CPU extracts the pedestrian as an obstacle having a possibility of colliding with the host vehicle.

When the CPU detects an object on a side in front of the host vehicle, the CPU determines whether or not the object may enter the predicted traveling course region and intersect with the tip end region of the host vehicle. In such a case, the side in front of the host vehicle refers to the detection regions of the front side radar sensors 12L, 12R. Specifically, when a line that extends in the movement direction of the object detected on the side in front of the host vehicle from the position of the object specified in step 515 intersects with the predicted traveling course region and the tip end region of the host vehicle, the CPU determines that the object may enter the predicted traveling course region and intersect with the tip end region of the host vehicle. When the CPU determines that the object may enter the predicted traveling course region and intersect with the tip end region of the host vehicle, the CPU extracts the object as an obstacle having a possibility of colliding with the host vehicle, regardless of whether the object is a pedestrian, a bicycle, an automobile, or the like.

As described above, the CPU estimates the left-side predicted traveling course as a "course through which the point positioned on the left side at the certain distance α from the left end of the front end portion of the host vehicle passes", and estimates the right-side predicted traveling course as a "course through which the point positioned on the right side at the certain distance α from the right end of the front end portion of the host vehicle passes". Thus, the CPU determines that even an object (a pedestrian, a bicycle, or the like) having a possibility of passing through the left-side vicinity or the right-side vicinity of the host vehicle "is within the predicted traveling course region or may enter the predicted traveling course region and intersect with the tip end region of the host vehicle". Accordingly, the CPU can extract even an object having a possibility of passing through the left side or the right side of the host vehicle as an obstacle.

As is understood from above, obstacles extracted by the process of step 570 include a pedestrian that is present in front of the host vehicle, a moving body that intersects with the right or left predicted traveling course of the host vehicle from a side of the host vehicle and then approaches to intersect with the tip end region of the host vehicle, a moving body that has a possibility of passing through a side of the host vehicle, and the like.

Next, the CPU transitions to step 575 to determine whether or not at least one obstacle is extracted in step 570.

When no obstacle is extracted in step 570, an obstacle for which the driver should be alerted is not present. In such a case, the CPU makes a "No" determination in step 575 and transitions to step 595 to temporarily finish the present routine. Consequently, the alert screen 70 (refer to FIG. 7) is not displayed.

When at least one obstacle is extracted in step 570, the CPU makes a "Yes" determination in step 575 and transitions to step 580.

In step 580, the CPU calculates the margin time period TTC of each obstacle extracted in the process of step 570. The margin time period TTC is a time period as described above.

As described above, the margin time period TTC is calculated by assuming that the obstacle is moved while maintaining the current relative speed and relative movement direction thereof. Accordingly, the relative speed of the obstacle should be acquired for the calculation of the margin time period TTC.

When the information indicating the current method of specifying the position of the object indicates the fusion method (that is, when the position of the object is currently specified by the fusion method), the CPU can use the relative speed included in the second object information from the radar sensor 12 as the relative speed of the obstacle for calculating the margin time period TTC. When the information indicating the current method of specifying the position of the object indicates the camera-alone method (that is, when the position of the object is currently specified by the camera-alone method), the CPU calculates the relative speed of the obstacle based on the first object information from the camera sensor 11 and uses the calculated relative speed for calculating the margin time period TTC.

Specifically, when the information indicating the current method of specifying the position of the object indicates the camera-alone method, the CPU reads, from the RAM, the distance between the obstacle and the host vehicle in the first object information that is read at the time of the previous execution of the present routine (hereinafter, referred to as the previous distance). When the CPU acquires the first object information and the second object information, the CPU stores the first object information and the second object information in the RAM. The CPU specifies the distance between the obstacle and the host vehicle in the first object information that is currently read in step 505 (hereinafter, referred to as the current distance). The CPU calculates the relative speed of the obstacle with respect to the host vehicle by dividing a value acquired by subtracting the current distance from the previous distance by a time period from the acquisition of the previous distance to the acquisition of the current distance.

The margin time period TTC represents a time period in which the driver can operate the host vehicle in order to avoid collision (includes abnormal approaching) between the host vehicle and the obstacle. That is, the margin time period TTC is a parameter representing the degree of emergency and corresponds to the degree of need of alert. That is, as the margin time period TTC is smaller, the degree of need of alert is increased. As the margin time period TTC is larger, the degree of need of alert is decreased.

Next, the CPU transitions to step 585 to determine whether or not the margin time period TTC of each obstacle calculated in step 580 is less than or equal to the predetermined threshold T1th. The CPU also determines whether or not at least one obstacle having the margin time period TTC less than or equal to the predetermined threshold T1th is present in step 585.

When an obstacle having the margin time period TTC less than or equal to the threshold T1th is not present (that is, when an obstacle satisfying the predetermined condition is not present), alert does not have to be provided by displaying the alert screen 70 (refer to FIG. 7). In such a case, the CPU makes a "No" determination in step 585 and transitions to step 595 to temporarily finish the present routine. Consequently, the alert screen 70 (refer to FIG. 7) is not displayed. That is, alert is not provided.

When at least one obstacle having the margin time period TTC less than or equal to the threshold T1th is present (that is, when an obstacle satisfying the predetermined condition is present), the CPU makes a "Yes" determination in step 585 and transitions to step 590. In step 590, the CPU provides alert by displaying, on the display 20, the alert screen 70 (refer to FIG. 7) that guides driver's line of sight in the direction of where the obstacle having the margin time period TTC less than or equal to the threshold T1th (alert target) is present, and transitions to step 595 to temporarily finish the present routine.

Details of the alert screen 70 will be described by using FIG. 7. The display region of the display 20 is provided in a region on the windshield of the host vehicle in front of a driver seat. The center line of the display region is illustrated by a dot-dashed line in FIG. 7. While the center line is illustrated for convenience of description, the center line is not displayed in the actual display region. The center line of the display region corresponds to the vehicle center line CL (refer to FIG. 3). A region on the left side of the center line of the display region corresponds to a left region around the front of the host vehicle. A region on the right side of the center line of the display region corresponds to a right region around the front of the host vehicle.

A sight line guiding icon 71 that guides driver's line of sight in the direction of the obstacle having the margin time period TTC less than or equal to the threshold T1th is displayed in the alert screen 70. In the present specification, the sight line guiding icon 71 may be referred to as a display element or a sight line guiding mark.

The sight line guiding icon 71 has a shape in which three arcs are linearly arranged. The sight line guiding icon 71 is displayed in a radial shape in a range of ±90 deg in the right-left direction from a predetermined position P0 on the center line of the display region as the center of the range. An arc that is further from the predetermined position P0 among the three arcs has a shorter length. The three arcs are lit in order from the closest arc to the position P0. The sight line guiding icon 71 can be displayed in units of angles (12 deg) acquired by equally dividing, into 15 parts, an angular range (180 deg) from a line that is a part of a horizontal line orthogonal with respect to the center line and extends to the right side from the position P0, to a line that is a part of the horizontal line and extends to the left side from the position P0. While a position (axis line) in which the sight line guiding icon 71 can be displayed is illustrated by a dotted line in FIG. 7, the dotted line is not displayed in the actual display region.

In the example illustrated in FIG. 7, the sight line guiding icon 71 indicates the direction at 18 deg to the right side from the center line of the display region and indicates that an "obstacle having the margin time period TTC less than or equal to the threshold T1th (alert target)" is present in the direction. By guiding driver's line of sight in the direction indicated by the sight line guiding icon 71, the driver is alerted to the alert target. When the CPU transitions to step 590 in FIG. 5, the CPU determines the direction indicated by the sight line guiding icon 71 based on the direction (azimuth) of the obstacle having the margin time period TTC less than or equal to the threshold T1th (alert target), and transmits a display instruction to the display (HUD) 20 to display the sight line guiding icon 71 in the direction.

When a plurality of obstacles having the margin time period TTC less than or equal to the threshold T1th is present, the CPU selects an obstacle having the minimum margin time period TTC. The CPU displays the alert screen 70 including the sight line guiding icon 71 that indicates the direction of where the obstacle having the minimum margin time period TTC is present.

It is assumed that the first object information read in step 505 and the second object information read in step 510 satisfy the camera-alone start condition when the information indicating the current method of specifying the position of the object indicates the fusion method. In such a case, when the CPU transitions to step 515, the CPU transitions to step 610 in FIG. 6. The CPU makes a "Yes" determination in step 610 and transitions to step 620. The camera-alone start condition is established when the first object information and the second object information satisfy at least one of (1) and (2). In such a case, the fusion method cannot be used for the specification of the position of the object, and the position of the object should be specified by using the camera-alone method. Accordingly, the CPU in step 620 sets (switches) the information indicating the method of specifying the position of the object to the camera-alone method and transitions to step 625.

In step 625, the CPU sets the fusion switching flag to "0" and transitions to step 630. As described above, the fusion switching flag is set to "1" to the time point after elapse of the predetermined time period T2 from the time point of switching the method of specifying the position of the object from the camera-alone method to the fusion method, or from the time point of switching the method of specifying the position of the object from the camera-alone method to the fusion method to the time point of switching the method of specifying the position of the object to the camera-alone method before elapse of the predetermined time period T2. Accordingly, when the method of specifying the position of the object is switched to the camera-alone method before elapse of the predetermined time period T2 from the switching of the method of specifying the position of the object to the fusion method, the fusion switching flag remains set to "1". Thus, the CPU sets the fusion switching flag to "0" in step 625.

In step 630, the CPU sets the camera-alone switching flag to "1" and transitions to step 635. In step 635, the CPU initializes a first switching timer (that is, sets (clears) the first switching timer to "0") and transitions to step 645. The first switching timer is a timer that measures an elapsed time period from the switching of the method of specifying the position of the object to the camera-alone method (refer to step 535 described below).

In step 645, the CPU specifies the position of the object by using the camera-alone method. The CPU transitions to step 695 to temporarily finish the present routine, and transitions to step 520 in FIG. 5. More specifically, the CPU specifies the azimuth of the object with respect to the host vehicle based on the first object information, and specifies the distance between the object and the host vehicle based on the first object information.

When the camera-alone switching flag is set to "1" in step 630, the CPU when transitioning to step 530 in FIG. 5 makes a "Yes" determination in step 530 and transitions to step 535. In step 535, the CPU substitutes the value of the first switching timer with a value acquired by incrementing the current value of the first switching timer by "1", and transitions to step 540.

In step 540, the CPU determines whether or not the value of the first switching timer is greater than or equal to a threshold TM1th. The value of the first switching timer is greater than or equal to the threshold TM1th when the predetermined time period T1 elapses from the switching of the method of specifying the position of the object to the camera-alone method.

When the value of the first switching timer is less than the threshold TM1th, the CPU makes a "No" determination in step 540 and transitions to step 543 to display a screen that is displayed on the display 20 at the time of the previous execution of the present routine. Then, the CPU transitions to step 595 to temporarily finish the present routine. That is, while the predetermined time period T1 (a time period corresponding to the threshold TM1th) elapses from the switching of the method of specifying the position of the object to the camera-alone method, the CPU does not perform the processes of step 570 and below, and display of the alert screen 70 for the object of which the position is specified by the camera-alone method is prohibited.

The reason why display of the alert screen 70 for the object of which the position is specified by the camera-alone method is prohibited immediately after the switching of the method of specifying the position of the object to the camera-alone method will be described. The distance between the object and the host vehicle is specified based on the first object information immediately after the switching to the camera-alone method. In the fusion method, the distance between the object and the host vehicle is specified based on the second object information. Thus, the distance between the object and the host vehicle immediately after the switching to the camera-alone method is significantly changed from the previous distance that is specified based on the second object information.

Accordingly, the movement direction of the object is not correctly calculated, and the accuracy of extracting the obstacle in step 570 is further decreased. When the method of specifying the position of the object is the camera-alone method, the relative speed of the object with respect to the host vehicle is calculated based on the amount of change in the distance between the object and the host vehicle. Thus, the relative speed of the object with respect to the host vehicle is also not correctly calculated immediately after the switching of the method of specifying the position of the object to the camera-alone method. Accordingly, the margin time period TTC of the obstacle is also not correctly calculated.

In the status where the accuracy of extracting the obstacle is further decreased, and the margin time period TTC of the obstacle is not correctly calculated, when the alert target is specified, and the alert screen 70 is displayed, the possibility of guiding driver's line of sight to an object having a relatively low possibility of colliding with the host vehicle is relatively high in the alert screen 70. Consequently, the driver may be confused.

Therefore, the present embodied apparatus sets the camera-alone switching flag to "1" while the predetermined time period T1 elapses from the time point at which the method of specifying the position of the object is switched to the camera-alone method. Accordingly, the alert screen 70 is not displayed by the processes of step 570 to step 590 in FIG. 5, and the previous screen is displayed in step 543. Consequently, the occurrence of the problem can be further prevented, and the possibility of confusing the driver can be further reduced.

When the value of the first switching timer becomes greater than or equal to the threshold TM1th (that is, when the predetermined time period T1 elapses from the time point at which the method of specifying the position of the object is switched to the camera-alone method), the CPU makes a "Yes" determination in step 540 and transitions to step 545. In step 545, the CPU sets the camera-alone switching flag to "0" and transitions to step 550.

In step 550, the CPU determines whether or not the fusion switching flag is set to "1". It is assumed that the fusion switching flag is not set to "1". That is, it is assumed that the current method of specifying the position of the object is the camera-alone method. In such a case, the CPU makes a "No" determination in step 550 and transitions to step 570 and below. Accordingly, the CPU extracts an obstacle based on the first object information, and calculates the margin time period TTC. The CPU determines whether or not there is an alert target by using the margin time period TTC. When the CPU determines that there is an alert target, the CPU provides alert. As described above, the relative speed of the obstacle that is used for calculating the margin time period TTC in such a case is calculated based on the distance between the obstacle and the host vehicle in the previous first object information and the distance between the obstacle and the host vehicle in the current first object information.

When the CPU transitions to step 515 in a status in which the information indicating the method of specifying the position of the object is set to the camera-alone method, the CPU makes a "No" determination in step 605 in FIG. 6 and transitions to step 640.

In step 640, the CPU determines whether or not the first object information read in step 505 and the second object information read in step 510 satisfy the fusion start condition.

Details of the fusion start condition will be described. The fusion start condition is a condition that is established when the method of specifying the position of the object can be switched from the camera-alone method to the fusion method by resolving the difference greater than allowable difference between the detection result of the first object information and the detection result of the second object information.

More specifically, the fusion start condition is a condition that is established when the following condition is established. When the following condition is established, the CPU makes a "Yes" determination in step 640.

A new object is detected in the second object information, and the position of the object indicated by the second object information is within the predetermined range from the position of the object detected in the first object information (in other words, the difference between the relative distance of an object detected by the camera sensor 11 and the relative distance of the same object detected by the radar sensor 12 is less than the threshold distance, and the difference between the azimuth of the object detected by the camera sensor 11 and the azimuth of the same object detected by the radar sensor 12 is less than the threshold angle).

An example in which the fusion start condition is established will be described. It is assumed that the radar sensor 12 cannot receive the reflective wave from the "object having relatively weak reflection intensity for the electric wave in the millimeter wave band", that (1) of the camera-alone start condition is established, and that the method of specifying the position of the object is switched to the camera-alone method. In such a case, when the distance between the host vehicle and the "object having relatively weak reflection intensity for the electric wave in the millimeter wave band" is decreased, the radar sensor 12 can receive the reflective wave from the object. The fusion start condition is established.

It is assumed that one object detected in the first object information is detected as a plurality of objects in the second object information, that (1) or (2) of the camera-alone start condition is established, and that the method of specifying the position of the object is switched to the camera-alone method. In such a case, when one object detected in the first object information is detected as one object in the second object information, the fusion start condition is established.

Similarly, it is assumed that an object detected as a plurality of objects in the first object information is detected as one object in the second object information, that (1) or (2) of the camera-alone start condition is established, and that the method of specifying the position of the object is switched to the camera-alone method. In such a case, when an object detected as one object in the second object information is detected as a plurality of objects, the fusion start condition is established.

When the "first object information read in step 505 and the second object information read in step 510 in FIG. 5" do not satisfy the fusion start condition in a status where the information indicating the method of specifying the position of the object is set to the camera-alone method, the CPU makes a "No" determination in step 640 and transitions to step 645.

In step 645, the CPU specifies the position of the object by using the camera-alone method. The CPU transitions to step 695 to temporarily finish the present routine, and transitions to step 520 in FIG. 5. The CPU reads the vehicle status information in step 520, estimates the predicted traveling course in step 525, and transitions to step 530.

Here, both of the camera-alone switching flag and the fusion switching flag are not set. Thus, the CPU makes a "No" determination in step 530, makes a "No" determination in step 550, and transitions to step 570 and below. Consequently, an obstacle is extracted based on the first object information detected by the camera sensor 11, and the margin time period TTC of the obstacle is calculated. When an obstacle having the calculated margin time period TTC less than or equal to the threshold T1th is present, the alert screen 70 is displayed.

In such a state, when the "first object information read in step 505 and the second object information read in step 510" satisfy the fusion start condition, the CPU makes a "Yes" determination in step 640 in FIG. 6 and transitions to step 650. In step 650, the CPU sets the information indicating the method of specifying the position of the object to the fusion method and transitions to step 655. In step 655, the CPU sets the camera-alone switching flag to "0" and transitions to step 660.

As described above, the camera-alone switching flag is set to "1" to the time point after elapse of the predetermined time period T1 from the time point of switching the method of specifying the position of the object from the fusion method to the camera-alone method, or from the time point of switching the method of specifying the position of the object from the fusion method to the camera-alone method to the time point of switching the method of specifying the position of the object to the fusion method before elapse of the predetermined time period T1. Accordingly, when the method of specifying the position of the object is switched to the fusion method before elapse of the predetermined time period T1 from the time point of being switched to the camera-alone method, the camera-alone switching flag remains set to "1". Thus, the camera-alone switching flag is set to "0" in step 655.

Next, the CPU in step 660 sets the fusion switching flag to "1" and transitions to step 665 to initialize a second switching timer (that is, sets (clears) the second switching timer to "0"). The CPU transitions to step 615. In step 615, the CPU specifies the position of the object by using the fusion method. The CPU transitions to step 695 to temporarily finish the present routine, and transitions to step 520 in FIG. 5.

In step 520, the CPU reads the vehicle status information and transitions to step 525 to estimate the predicted traveling course. The CPU transitions to step 530. In such a case, since the camera-alone switching flag is set to "0", the CPU makes a "No" determination in step 530 and transitions to step 550. Since the fusion switching flag is set to "1" in step 660 in FIG. 6, the CPU makes a "Yes" determination in step 550 and transitions to step 555.

In step 555, the CPU substitutes the value of the second switching timer with a value acquired by incrementing the current value of the second switching timer by "1", and transitions to step 560.

In step 560, the CPU determines whether or not the value of the second switching timer is greater than or equal to a threshold TM2th. The value of the second switching timer is greater than or equal to the threshold TM2th when the predetermined time period T2 elapses from the switching of the method of specifying the position of the object to the fusion method.

When the value of the second switching timer is less than the threshold TM2th, the CPU makes a "No" determination in step 560 and transitions to step 543 to display the screen that is displayed on the display 20 at the time of the previous execution of the present routine. The CPU transitions to step 595 to temporarily finish the present routine. That is, while the predetermined time period T2 (a time period corresponding to the threshold TM2th) elapses from the switching of the method of specifying the position of the object to the fusion method, the CPU does not perform the processes of step 570 and below, and display of the alert screen 70 for the object of which the position is specified by the fusion method is prohibited.

The reason why display of the alert screen 70 for the object of which the position is specified by the fusion method is prohibited immediately after the switching of the method of specifying the position of the object to the fusion method will be described. The distance between the object and the host vehicle is specified based on the second object information immediately after the switching to the fusion method. In the camera-alone method, the distance between the object and the host vehicle is specified based on the first object information. Thus, the distance between the object and the host vehicle immediately after the switching to the fusion method is significantly changed from the previous distance that is specified based on the first object information.

Accordingly, the movement direction of the object is not correctly calculated, and the accuracy of extracting the obstacle in step 570 is further decreased. When the method of specifying the position of the object is the fusion method, the relative speed that is included in the second object information and is detected with higher accuracy can be used as the relative speed of the object with respect to the host vehicle. Thus, the margin time period TTC of the obstacle can be correctly calculated. Accordingly, the margin time period TTC can be correctly calculated immediately after the switching of the method of specifying the position of the object to the fusion method. However, as described above, since the accuracy of extracting the obstacle is further decreased, there is a relatively high possibility of erroneously providing alert immediately after the switching of the method of specifying the position of the object to the fusion method.

Thus, while the predetermined time period T2 elapses from the switching of the method of specifying the position of the object to the fusion method, an obstacle is not extracted in step 570 in FIG. 5, and the previous screen is displayed in step 543.

When the value of the second switching timer becomes greater than or equal to the threshold TM2th (that is, when the predetermined time period T2 elapses from the time point of switching the method of specifying the position of the object to the fusion method), the CPU makes a "Yes" determination in step 560 and transitions to step 565. In step 565, the CPU sets the fusion switching flag to "0" and transitions to step 570 and below. Consequently, an obstacle is extracted based on both of the first object information and the second object information, and the margin time period TTC of the obstacle is calculated. When an obstacle having the calculated margin time period TTC less than or equal to the threshold T1th is present, the alert screen 70 is displayed.

As described heretofore, the present embodied apparatus prohibits display of a new alert screen 70 and continues displaying the previous screen, while the predetermined time period T1 elapses from the switching of the method of specifying the position of the object from the fusion method to the camera-alone method. The present embodied apparatus prohibits display of a new alert screen 70 and continues displaying the previous screen, while the predetermined time period T2 elapses from the switching of the method of specifying the position of the object from the camera-alone method to the fusion method. Accordingly, display of an incorrect alert screen 70 can be further prevented, and the driver can be further prevented from confusion.

The predetermined time period T2 is set to a time period in which a "change in the position of the object before and after switching of the method of specifying the position of the object" does not affect the calculation of the movement direction of the object. In the period of the predetermined time period T2 in which the method of specifying the position of the object is the fusion method, the relative speed of the object with respect to the host vehicle can be immediately specified based on the second object information transmitted from the radar sensor 12 without being based on the time-series data of the position of the object. When the method of specifying the position of the object is the camera-alone method, the relative speed of the object with respect to the host vehicle is calculated based on the time-series data of the position of the object. Thus, the predetermined time period T1 should be set by considering a time period in which the "change in the position of the object before and after switching of the method of specifying the position of the object" does not affect both of the calculation of the "movement direction of the object" and the calculation of the "relative speed of the object with respect to the host vehicle". Accordingly, the predetermined time period T1 is set to be longer than the predetermined time period T2. That is, the predetermined time period T2 is set to be shorter than the predetermined time period T1. Accordingly, when the method of specifying the position of the object is switched to the fusion method, the alert screen 70 is immediately displayed for the object of which the position and the relative speed are specified by a method having higher accuracy of detection.

Next, processes executed at time ta, time t1, time tb, time t2, and time tc illustrated in FIG. 4 will be briefly described.

At time ta, the method of specifying the position of the object is the fusion method. The first object information and the second object information read at time ta do not satisfy the camera-alone start condition, and both of the camera-alone switching flag and the fusion switching flag are not set.

In such a case, when the CPU transitions to step 515 in FIG. 5, the CPU transitions to step 605 in FIG. 6. The CPU makes a "Yes" determination in step 605 and makes a "No" determination in step 610. The CPU transitions to step 615 to specify the position of the object by using the fusion method. Then, the CPU executes step 520 and step 525 in FIG. 5 in order and transitions to step 530.

In such a case, since the camera-alone switching flag is not set, the CPU makes a "No" determination in step 530 and transitions to step 550. Since the fusion switching flag is not set, the CPU makes a "No" determination in step 550 and transitions to step 570 and below. Consequently, based on the object information acquired by the fusion method, the CPU determines whether or not alert should be provided (the alert screen 70 should be displayed), and provides alert in accordance with the determination result.

In the example illustrated in FIG. 4, the camera-alone start condition is satisfied when time t1 arrives. In such a stage, the method of specifying the position of the object is the fusion method. Accordingly, when the CPU transitions to step 515 in FIG. 5, the CPU transitions to step 605 in FIG. 6. The CPU makes a "Yes" determination in step 605 and transitions to step 610. The CPU makes a "Yes" determination in step 610, performs the processes of step 620 to step 635, and transitions to step 645. Consequently, the information indicating the method of specifying the position of the object is set to the camera-alone method, and the fusion switching flag is set to "0". Since the fusion switching flag is "0" immediately before time t1, the process of step 625 is performed for verification purposes. The camera-alone switching flag is set to "1", and the first switching timer is initialized. The position of the object is specified by the camera-alone method. Consequently, when the CPU transitions to step 520 and below and transitions to step 530 in FIG. 5, the CPU makes a "Yes" determination in step 530 and transitions to step 535. In step 535, the CPU increments the value of the first switching timer by "1" and transitions to step 540. Since the camera-alone start condition is just established at time t1, the predetermined time period T1 does not elapse from the switching of the method of specifying the position of the object to the camera-alone method. Thus, the CPU makes a "No" determination in step 540 and transitions to step 543 to display the alert screen 70 that is displayed immediately before time t1.

When time tb illustrated in FIG. 4 arrives, the predetermined time period T1 elapses from the switching to the camera-alone method at time t1. Accordingly, the CPU increments the value of the first switching timer by "1" in step 535 and transitions to step 540. The CPU makes a "Yes" determination in step 540 and transitions to step 550 through step 545. Since the fusion switching flag is not set to "1", the CPU makes a "No" determination in step 550 and transitions to step 570 and below. Consequently, based on the object information acquired by the camera-alone method, the CPU determines whether or not alert should be provided (the alert screen 70 should be displayed), and provides alert in accordance with the determination result.

The fusion start condition is satisfied when time t2 illustrated in FIG. 4 arrives. In such a state, the method of specifying the position of the object is the camera-alone method. Accordingly, when the CPU transitions to step 515 in FIG. 5, the CPU transitions to step 605 in FIG. 6. The CPU makes a "No" determination in step 605 and transitions to step 640. The CPU makes a "Yes" determination in step 640, performs the processes of step 650 to step 665, and transitions to step 615. Consequently, the information indicating the method of specifying the position of the object is set to the fusion method, and the camera-alone switching flag is set to "0". Since the camera-alone switching flag is "0" immediately before time t2, the process of step 655 is performed for verification purposes. The fusion switching flag is set to "1", and the second switching timer is initialized. The position of the object is specified by the fusion method. Consequently, when the CPU transitions to step 520 and below and transitions to step 550 in FIG. 5, the CPU makes a "Yes" determination in step 550 and transitions to step 555. In step 555, the CPU increments the value of the second switching timer by "1" and transitions to step 560. Since the fusion start condition is just established at time t2, the predetermined time period T2 does not elapse from the switching of the method of specifying the position of the object to the fusion method. Thus, the CPU makes a "No" determination in step 560 and transitions to step 543 to display the alert screen 70 that is displayed immediately before time t2.

When time tc illustrated in FIG. 4 arrives, the predetermined time period T2 elapses from the switching to the fusion method at time t2. Accordingly, the CPU increments the value of the second switching timer by "1" in step 555 and transitions to step 560. The CPU makes a "Yes" determination in step 560 and transitions to step 570 and below through step 565. Consequently, based on the object information acquired by the fusion method, the CPU determines whether or not alert should be provided (the alert screen 70 should be displayed), and provides alert in accordance with the determination result.

The present disclosure is not limited to the embodiment and can employ various modification examples within the scope of the present disclosure. For example, the predetermined time period T1 when the method of specifying the position of the object is switched from the fusion method to the camera-alone method may be the same time period as the predetermined time period T2 when the method of specifying the position of the object is switched from the camera-alone method to the fusion method.

The sight line guiding icon 71 may have any design as long as having each function of guiding driver's line of sight described above.

In step 570, when the CPU extracts an obstacle from objects detected by the front radar sensor 12C, the CPU may extract an object that is "within the predicted traveling course region or is predicted to enter the predicted traveling course region and intersect with the tip end region of the host vehicle" as an obstacle regardless of whether or not the object is a pedestrian.

What is claimed is:

1. An in-vehicle alert apparatus comprising:
   a camera sensor configured to capture an image of a region around a host vehicle and detect an azimuth of an object with respect to the host vehicle and a distance between the object and the host vehicle based on the captured image;
   a radar sensor configured to radiate an electric wave to the region around the host vehicle, receive a reflective wave of the electric wave, and detect the azimuth of the object with respect to the host vehicle and the distance between the object and the host vehicle based on the reflective wave;
   a display unit on which an alert screen which guides driver's line of sight is displayed; and
   an electronic control unit configured to
      specify a position and a relative speed of the object by selectively using any of a fusion method and a camera-alone method, the fusion method specifying the position of the object by specifying the azimuth of the object with respect to the host vehicle based on first object information and by specifying the distance between the object and the host vehicle based on second object information, and specifying the relative speed which is a speed of the object with respect to the host vehicle based on the second object information, the camera-alone method specifying the position of the object by specifying the azimuth of the object with respect to the host vehicle and by specifying the distance between the object and the host vehicle based on the first object information, and calculating the relative speed based on the specified distance, the first object information including information related to the azimuth of the object with respect to the host vehicle and the distance between the object and the host vehicle detected by the camera sensor, and the second object information including information related to the azimuth of the object with respect to the host vehicle and the distance between the object and the host vehicle detected by the radar sensor,
      acquire vehicle status information related to a traveling status of the host vehicle,
      extract an obstacle having a relatively high possibility of colliding with the host vehicle, based on at least one of the specified position of the object and a movement direction of the object depending on a change in the position of the object,
      calculate a margin time period in which the extracted obstacle reaches a tip end region including a front end portion of the host vehicle, based on the specified distance between the object and the host vehicle and the specified relative speed, and
      display a screen that guides driver's line of sight in a direction of the obstacle having the margin time period less than or equal to a threshold, as the alert screen on the display unit, wherein:

the electronic control unit is configured to switch a method of specifying the position and the relative speed of the object from the camera-alone method to the fusion method when the first object information and the second object information satisfy a first condition in specifying the position and the relative speed of the object by using the camera-alone method, and switch the method of specifying the position and the relative speed of the object from the fusion method to the camera-alone method when the first object information and the second object information satisfy a second condition in specifying the position and the relative speed of the object by using the fusion method; and the electronic control unit is configured to prohibit display of the alert screen for the object of which the position and the relative speed are specified by using the camera-alone method, while a first predetermined time period elapses from a time point of switching of the method of specifying the position and the relative speed of the object from the fusion method to the camera-alone method, and prohibit display of the alert screen for the object of which the position and the relative speed are specified by using the fusion method, while a second predetermined time period elapses from a time point of switching of the method of specifying the position and the relative speed of the object from the camera-alone method to the fusion method.

2. The in-vehicle alert apparatus according to claim 1, wherein the electronic control unit configured to set the second predetermined time period to a shorter time period than the first predetermined time period.

3. The in-vehicle alert apparatus according to claim 1, wherein:

the first condition is that a difference greater than an allowable difference between a detection result of the first object information and a detection result of the second object information is resolved; and the second condition is that a difference greater than the allowable difference is generated between the detection result of the first object information and the detection result of the second object information.

4. The in-vehicle alert apparatus according to claim 3, wherein:

when a new object is detected in the second object information, and the position of the object indicated by the second object information is within a predetermined range from the position of the object detected in the first object information, the first condition is satisfied; and when the difference greater than the allowable difference is generated between the detection result of the first object information and the detection result of the second object information, the second condition is satisfied.

5. The in-vehicle alert apparatus according to claim 4, wherein the first condition is that a difference between a relative distance of the object detected by the camera sensor and the relative distance of the same object detected by the radar sensor is less than a threshold distance, and that a difference between the azimuth of the object detected by the camera sensor and the azimuth of the same object detected by the radar sensor is less than a threshold angle.

6. The in-vehicle alert apparatus according to claim 4, wherein the second condition is a condition that is established when at least one of:

i) the object detected in the first object information is not detected in the second object information, and ii) the position of the object detected in the first object information and the position of the object detected in the second object information are not within the predetermined range, is established.

7. A method of controlling an in-vehicle alert apparatus including a camera sensor configured to capture an image of a region around a host vehicle and detect an azimuth of an object with respect to the host vehicle and a distance between the object and the host vehicle based on the captured image; a radar sensor configured to radiate an electric wave to the region around the host vehicle, receive a reflective wave of the electric wave, and detect the azimuth of the object with respect to the host vehicle and the distance between the object and the host vehicle based on the reflective wave; a display unit on which an alert screen which guides driver's line of sight is displayed; and an electronic control unit, the method comprising:

specifying a position and a relative speed of the object by selectively using any of a fusion method and a camera-alone method, the fusion method of which specifies the position of the object by specifying the azimuth of the object with respect to the host vehicle based on first object information and specifying the distance between the object and the host vehicle based on second object information and specifies the relative speed which is a speed of the object with respect to the host vehicle based on the second object information, the camera-alone method of which specifies the position of the object by specifying the azimuth of the object with respect to the host vehicle and specifying the distance between the object and the host vehicle based on the first object information and calculates the relative speed based on the specified distance, the first object information including information related to the azimuth of the object with respect to the host vehicle and the distance between the object and the host vehicle detected by the camera sensor, and the second object information including information related to the azimuth of the object with respect to the host vehicle and the distance between the object and the host vehicle detected by the radar sensor;

acquiring vehicle status information related to a traveling status of the host vehicle;

extracting an obstacle having a relatively high possibility of colliding with the host vehicle, based on at least one of the specified position of the object and a movement direction of the object depending on a change in the position of the object;

calculating a margin time period in which the extracted obstacle reaches a tip end region including a front end portion of the host vehicle, based on the specified distance between the object and the host vehicle and the specified relative speed;

displaying a screen that guides driver's line of sight in a direction of the obstacle having the margin time period less than or equal to a threshold, as the alert screen on the display unit;

switching a method of specifying the position and the relative speed of the object from the camera-alone method to the fusion method when the first object information and the second object information satisfy a first condition in specifying the position and the relative speed of the object by using the camera-alone method, and switching the method of specifying the position and the relative speed of the object from the fusion method to the camera-alone method when the first object information and the second object information satisfy a second condition in specifying the position and the relative speed of the object by using the fusion method;

prohibiting display of the alert screen for the object of which the position and the relative speed are specified by using the camera-alone method, while a first predetermined time period elapses from a time point of switching of the method of specifying the position and the relative speed of the object from the fusion method to the camera-alone method; and prohibiting display of the alert screen for the object of which the position and the relative speed are specified by using the fusion method, while a second predetermined time period elapses from a time point of switching of the method of specifying the position and the relative speed of the object from the camera-alone method to the fusion method.

* * * * *